Patented Oct. 4, 1927.

1,644,417

UNITED STATES PATENT OFFICE.

JOSEPH G. DAVIDSON, OF PITTSBURGH, PENNSYLVANIA, ASSIGNOR TO CARBIDE AND CARBON CHEMICALS CORPORATION, A CORPORATION OF NEW YORK.

SOLUTION OF CELLULOSE ESTERS.

No Drawing. Application filed June 13, 1924. Serial No. 719,891.

The invention relates to solutions of cellulose esters, such as are employed, for example, as lacquers for metal; and its object is to provide improved compositions of this class.

Many solvents for cellulose esters, such as the nitrate and acetate esters, are known. Butyl and amyl acetates are often used; and acetylene tetrachlorid, ethylene chlorhydrin, and diacetone alcohol $$(CH_3COCH_2COH(CH_3)_2)$$

may also be mentioned. There are many others.

As compared with known solutions of cellulose esters, solutions containing the mono- or dialkyl ethers of ethylene glycol exhibit certain advantageous qualities. The ethers may be used with or without other solvents or diluents to form a vehicle for the cellulose ester, since they are compatible with known solutions of cellulose esters, improve or at least do not injure the film deposited, and are solvents for many gums and resins which are commonly employed in lacquers. Among the compounds of this class there may be mentioned the following:

| Compound. | Boiling point (° C.) |
|---|---|
| Monomethyl ether | 125 |
| Dimethyl ether | 83 |
| Monoethyl ether | 135 |
| Diethyl ether | 124 |
| Monopropyl ether | 150 |
| Dipropyl ether | 160 |
| Monoallyl ether | 159 |
| Diisobutyl ether | 181 |

Amyl and butyl acetates have strong disagreeable odors whereas certain of the ethers of the class mentioned, particularly the monoethyl ether, are practically odorless. The ethers contain no acid radical and do not hydrolyze, and they possess other advantageous characteristics.

The alkyl ethers of ethylene glycol dissolve cellulose nitrate readily, and some of them can be combined with other substances to produce remarkable solvents for cellulose acetate. Thus a mixture of equal parts of monoethyl ether and ethylene dichlorid will dissolve sufficient cellulose acetate to make a lacquer in three or four minutes, giving a clear, non-viscous solution in that time, whereas with some solvents now employed a period of as much as eight or ten hours, with rolling or kneading of the components, is necessary to attain the same result. In connection with the foregoing it is of interest to note that neither the monoethyl ether or ethylene dichlorid is alone a solvent for cellulose acetate.

An excellent lacquer may be made from a solution of cellulose acetate in a mixture of the monoethyl ether and ethylene dichlorid by adding to the solution a small quantity of a high-boiling solvent for the cellulose acetate, such as glycol mono- or diacetate, acetylene tetrachlorid, diacetone alcohol, or the like. This high-boiling addition assists in the production of a transparent adherent film on drying a coat of the lacquer, and as little as 1% or 2% of the high-boiling addition may be effective for this purpose. Solvents and diluents other than those mentioned may also be incorporated in the solution.

Compositions according to my invention may be free from liquids other than the ethylene glycol ethers, but it usually will be preferable to employ an auxiliary solvent or diluent for reasons of economy or to modify the properties of the solution. Useful solutions may be made as follows: Three weights of nitro-cellulose is dissolved in 40 weights of ethylene glycol monoethyl ether, or the diethyl ether, or a mixture of the two. Complete solution is rapidly effected. About 75 weights of benzene is then added. Instead of benzene, acetone, methyl or ethyl alcohol, naphtha, or other diluent may be used, according to the intended use.

I claim:

1. A composition of matter comprising a solution of a cellulose ester containing a substantial proportion of an alkyl ether of ethylene glycol.

2. A composition of matter comprising a solution of cellulose acetate containing a substantial proportion of an alkyl ether of ethylene glycol.

3. A composition of matter comprising a solution of a cellulose ester containing a substantial proportion of ethylene glycol monoethyl ether.

4. A composition of matter comprising a solution of cellulose acetate containing a substantial proportion of ethylene glycol monoethyl ether.

5. A composition of matter comprising a solution of cellulose acetate containing ethylene glycol monoethyl ether and ethylene dichlorid.

6. A composition of matter comprising a solution of cellulose acetate containing ethylene dichlorid, ethylene glycol monoethyl ether, and a solvent for cellulose acetate having a higher boiling point than said ether.

In testimony whereof, I affix my signature.

JOSEPH G. DAVIDSON.